United States Patent [19]

Hashimoto

[11] 4,405,775

[45] Sep. 20, 1983

[54] BIAXIALLY ORIENTED POLYPROPYLENE FILM AND METHOD FOR ITS PRODUCTION

[75] Inventor: Fukashi Hashimoto, Yokkaichi, Japan

[73] Assignee: Mitsubishi Petrochemical Company Limited, Japan

[21] Appl. No.: 272,701

[22] Filed: Jun. 11, 1981

[30] Foreign Application Priority Data

Jun. 20, 1980 [JP] Japan .................................. 55-82713

[51] Int. Cl.$^3$ .......................... C08L 23/12; B29D 7/24
[52] U.S. Cl. ................................. 526/351; 264/290.7; 264/290.2
[58] Field of Search .......................... 264/290.2, 210.7; 526/351

[56] References Cited

U.S. PATENT DOCUMENTS

| 3,223,764 | 12/1965 | Kahn et al. | 264/290.2 |
| 3,286,009 | 11/1966 | Yumoto et al. | 264/290.2 |
| 3,380,868 | 4/1968 | Moser | 264/290.2 |
| 3,536,644 | 10/1970 | Frizelle et al. | 264/290.2 |
| 4,261,944 | 4/1981 | Hufnagal et al. | 264/290.2 |

FOREIGN PATENT DOCUMENTS

| 671029 | 9/1963 | Canada | 264/290.2 |
| 915694 | 1/1963 | United Kingdom | 264/290.2 |

OTHER PUBLICATIONS

Translation of Italian Patent 594971, Inventor Fior et al., 6/59 pp. 1-12.

*Primary Examiner*—James B. Lowe

[57] ABSTRACT

This invention relates to biaxially oriented polypropylenefilm and method for its production. The method for its production comprises a step of fusing and extruding polypropylene in a sheet form, a step of cooling and solidifying a formed polypropylene film, a step of preheating it and a step of orienting it in a longitudinal direction and finally in a lateral direction, characterized in that a longitudinal orientation of the polypropylene film is carried out by at least a double-stage process. The polypropylene film thus biaxially oriented has improved rigidity.

8 Claims, No Drawings

BIAXIALLY ORIENTED POLYPROPYLENE FILM AND METHOD FOR ITS PRODUCTION

BACKGROUND OF THE INVENTION

This invention relates to biaxially oriented polypropylene film and method for its production, in which rigidity of the biaxially oriented polypropylene is improved.

Biaxially oriented polypropylene is used as a packing material or an industrial material because of its excellent transparence, moisture barrier properties, good workability, etc. However, copared with cellophane which competes with biaxially oriented polypropylene, the latter is inferior to the former in rigidity. Accordingly, the latter is not always a perfect material.

By improving rigidity of the biaxially oriented polypropylene film, it can be produced rigidly and thinly, so that its cost may be reduced. Further, such an improved polypropylene film biaxially oriented may become a more suitable material for printing machines, packing machines, etc. Accordingly, a way to improve the rigidity of the biaxially oriented polypropylene film has been considered in this industry.

Conventional methods for improving the rigidity of the biaxially oriented polypropylene film will now be referred to briefly. Any one of them means a post process of biaxial orientation of the polypropylene film.

According to Japanese Examined Patent Publication No. 34-5887, biaxially oriented polypropylene film is again oriented in a longitudinal direction.

According to Japanese Examined Patent Publication No. 49-18628, it is again oriented in a longitudinal direction for a long distance.

According to Japanese Examined Patent Publication No. 46-9677, the polypropylene film is again oriented in a longitudinal direction by a double-stage process.

Further, according to Japanese Examined Patent Publications Nos. 43-26110, 54-61269 and 54-66978, it is oriented in a longitudinal direction and then biaxially at the same time.

However, any one of the conventional techniques needs a larger device in addition to the existing equipment, a broader space therefor and consequently incurs extra cost. Further, the biaxially oriented polypropylene film which has been obtained by each of the above conventional techniques has an improved property in the longitudinal orientation, but its property in the lateral orientation is greatly degraded. Finally, a certain amount of imbalance is caused between the longitudinal rigidity and the lateral rigidity, thereby the film's stability is lost. In order to remove the disadvantages of the conventional art, this invention has been accomplished.

BRIEF SUMMARY OF THE INVENTION

It is an object of this invention to provide apparatus and method for producing a biaxially oriented polypropylene film, in which its longitudinal orientation prior to a lateral orientation is carried out by at least a double-stage process, whereas it has conventionally been done by a one-stage process.

Preferably, the polypropylene film is oriented in the first stage's longitudinal orientation by at least 50 to 90 percent of its overall longitudinal orientation. Further, the longitudinal orientation is carried out preferably with two or three steps. Further, the film temperature in each stage's longitudinal orientation is equivalent to, or higher than, that in the former stage's longitudinal orientation. Still further, the method of this invention is characterized in that an isotactic index of the polypropylene is no less than 98.0 percent.

It is another object of this invention to provide a novel biaxially oriented polypropylene film which can be produced by the aforementioned apparatus and method, which has a high refractive index in a longitudinal, lateral and thickness direction as well as excellent rigidity.

Other and further objects, features and advantages of this invention will be apparent from the following description.

DETAILED DESCRIPTION OF THIS INVENTION

A method for producing a biaxially oriented polypropylene film according to this invention will now be described in detail.

The method of the invention comprises a step of heating and fusing polypropylene resins in an extruder and extruding them in a sheet from a T-type die, a step of cooling and solidifying the formed polypropylene sheet on a cooling roll, a step of preheating it to a temperature of 100° to 150° C. by means of a group of preheating rolls, a step of orienting it by about 4.5 to 5.5 times in a longitudinal direction by making use of a circumferential velocity difference of the preheating rolls, a step of preheating it in an oven at a temperature of 150° to 200° C. and finally a step of orientating it by about 8 to 10.5 times to a lateral orientation, characterized in that a longitudinal orientation of the polypropylene film is carried out by a double-stage process.

The magnification of an overall longitudinal orientation is from 4 to 15 times, preferably 6 to 14 times.

If it is less than 4 times, no remarkable effect is obtained and if it is more than 15 times, a film forming stability in a lateral orientation as a next step is worsened. Further, a first-stage film orientation in a longitudinal direction is preferably 50 to 90 percent, preferably 55 to 80 percent of the overall longitudinal orientation. The longitudinal orientation is carried out in 2 to 5 stages in view of quality maintenance, preferably 2 to 3 stages. The film temperature in each stage's longitudinal orientation is about equal to, or from about 3° to about 10° C. higher than that in the previous stage's longitudinal orientation; normally 100° C. to 135° C., preferably 115° to 135° C. Generally, the film temperature in the second stage's longitudinal orientation is 110° C. to 160° C., preferably 115° to 150° C. Particularly, the film temperature in the last stage's longitudinal orientation is 130° C. to 160° C., preferably 130° to 150° C. The magnification of each stage's longitudinal orientation is adjusted by a circumferential velocity difference of multi-stages rolls in a longitudinal orienting machine.

The magnification of the lateral film orientation is conventionally from 8 to about 10 times, but can be set from 8 to 15 times. Preferably, it is from 9 to 15 times, more particularly from 11 to 15 times.

The lateral film orientation is generally carried out by a tenter, and its magnification is adjusted by changing the width of the tenter.

The polypropylene which is used in this invention may be the one that is on the market, and preferably is one that has an isotactic index of 98.0% or more measured by ISO R 922-1969. More particularly, an isotactic index is 98.5 to 99.5% is preferred. By defining the isotactic index within this range, the heat shrinkage rate of the biaxially oriented film can be improved.

The biaxially oriented polyethylene film obtained in accordance with the aforementioned method is characterized in that a refractive index Nx of the longitudinal orientation at a temperature of 20° C. is no less than 1.5040 and a refractive index Ny of the lateral orientation at the same temperature is no less than 1.5120, and the total of the former and the latter is no less than 3.023. When both the refractive indices Nx and Ny and a refractive index Nz of a thickness-directional orientation respectively are set to more than 1.5150, 1.5250 and 1.5025 respectively, it becomes difficult to produce the biaxially oriented polypropylene of this invention. A lower limit of the refractive index Nz is preferably 1.4970 in order to maintain rigidity and transparence. Accordingly, a more desirable refractive index of the biaxially oriented polypropylene film is 1.5050 to 1.5130 at Nx and 1.5130 to 1.5240 at Ny, and the total of Nx and Ny is 3.0240 to 3.0310 and Nz is within 1.4970 to 1.5020. Further, the average value of the refractive indices Nx, Ny, Nz is preferably within the following scope.

$$1.5070 \leq \frac{Nx + Ny + Nz}{3} \leq 1.5120$$

More preferably, $1.5070 \leq \frac{Nx + Ny + Nz}{3} \leq 1.5110$

Further, the thickness of the polypropylene film thus biaxially oriented is 4 to 150 microns, preferably 15 to 100 microns.

Preferred examples of this invention will now be described in connection with Comparative Examples.

The Young's modulus, refractive index, heat shrinkage rate and isotactic index of the biaxially oriented polypropylene according to this invention were measured by the following methods.

(1) Young's modulus:

A test piece having a length of 300 mm and a width of 15 mm was conditioned at a temperature of 21° C. to 23° C. for 24 hours. It was grasped by two grasping means of an Instron-type Tensile Tester at a distance of 250 mm and tensioned at a tensile speed of 2.5 mm per minute. Then, the tension curve under an application of load was recorded by a tester. Based upon an initial slope of the then recorded curve, $$\frac{\text{tensile stress (kg/cm}^3\text{)}}{\text{strain rate (cm/cm)}}$$

was obtained. (Based upon ISO R 1184 in 1970)

(2) Refractive index

The test piece was mounted by corresponding its longitudinal direction to a left-to-right direction of an optical axis of an Abbe refractometer. Then, the test piece and a prism of the Abbe refractometer were optically coupled closely to each other using a few drops of benzyl alcohol.

Subsequently, the refractive index of the test piece was measured in a normal way by peering through a polaroid filter from an eyepiece. When the polaroid direction was left-to-right, Ny of the test piece and the refractive index of the benzyl alcohol could be measured. By turning the polaroid filter by 90°, they could be measured.

Next to this, by turning the test piece by 90°, Nx, Nz and the refractive index of the benzyl alcohol could also be measured. In this way, five points per test piece were measured, and their average value was calculated. The measuring temperature was 23° C. (Ref. The Journal of the Society of Chemical Industry, Japan, Vol. 42, pp 810–819, 1939 issue)

The symbols for the refractive index are defined as follows.

Nx: Refractive index in a longitudinal film orientation
Ny: Refractive index in a lateral film orientation
Nz: Refractive index in a thickness-directional film orientation $$\overline{N} : \frac{Nx + Ny + Nz}{3}$$

(3) Heat shrinkage rate:

After the test piece of 100 m², oriented to a longitudinal and lateral orientation, was immersed in a constant temperature bath within ±1° C. of respective measuring temperatures listed in Table 5, it was taken out and the heat shrinkage rate thereof was calculated by the following equation based upon measurement of the dimensions of the longitudinal and lateral orientation before and after immersion of the test piece.

$$\text{Heat shrinkable rate (\%)} = \frac{lo - l}{lo} \times 100$$

lo: Length(mm) of the test piece before the immersion
l: Length(mm) of the test piece after the immersion In this test the heat shrinkage rate of five samples was measured at respective measuring temperatures and the average rate was obtained.

(4) Isotactic index

A cylindrical filter paper having a diameter of 30 mm and a length of 120 mm was dried for 4 hours at a temperature of 60° C. in a vacuum drier, and cooled for half an hour in a dessicator cabinet. The then measured weight was called "A". A test piece S of 0.49 mg to 5.1 mg was placed on the cylindrical filter paper and it was put in an extracting section of a Soxhlet's extractor. Further, it was extracted for 2 hours while adjusting the temperature so as to obtain the reflux of 4 to 5 times every ten minutes by using n-heptane of 200 ml (having a first grade). After having extracted the cylindrical filter paper, it was cooled in air for 15 minutes and dried for about 2 hours until it reached a constant temperature of 60° C. in the vacuum drier. After drying, it was cooled in air for 30 minutes in the dessicator. The then measured weight was called "B". The isotactic index was obtained from the following equation.

$$\text{Isotactic index (\%)} = \frac{B - A}{S} \times 100$$

EXAMPLE 1

A sample of crystalline polypropylene having the tradename of MITSUBISHI NOBLEN FL 6S (MFR: 2.3 and an isotactic index: 97.1%) made by Mitsubishi Petrochemical Co., Ltd was heated and fused to a temperature of 245° C. in the extruder, and extruded on a water cooling metal roll by the T-type die. Thus, a sheet 1.5 mm thick was obtained. The sheet was heated to a temperature of 120° C. and oriented in a machine direction thereof, i.e. by 4.3 times in a longitudinal direction. Further, it was heated to a temperature of 125° C. and oriented by 1.4 times in the longitudinal direction. Consequently, as a whole it was oriented a total of 6 times in the longitudinal direction by a double-stage process. After that, it was oriented by 10 times in the lateral direction at 165° C. by means of a lateral stretcher, and wound up after heat setting at 165° C. The properties of the biaxially oriented polypropylene film obtained is shown in Table 1.

Comparative Example 1

A polypropylene sheet which was preheated to a temperature of 120° C. was oriented by 6 times in a single stage longitudinal orientation. The remainder of the process was the same as Example 1. The properties of the biaxially oriented polypropylene film obtained in this example is shown in Table 1.

As will be understood in Example 1 as well as in Comparative Example 1, when the longitudinal orientation and the lateral orientation respectively have the same magnification, the Young's modulus as well as the refractive index has become higher by orienting the longitudinal orientation with a double-stage process.

EXAMPLE 2

The polypropylene sheet was oriented by 4.5 times at 120° C. in a first-stage longitudinal orientation, then by 1.4 times at 120° C. in a second-stage longitudinal orientation, and finally by 1.15 times at 130° C. in a third-stage longitudinal oriented. As a whole, it was oriented by 7.2 times in the longitudinal direction. The remainder of the process was the same as Example 1. However, the tenter oven temperature in the lateral orientation was 180° C.

TABLE 1

| | HAZE (%) | Young's modulus (Kg/cm$^3$) | | Refractive index | | | |
| --- | --- | --- | --- | --- | --- | --- | --- |
| | | Longitudinal orientation | Lateral orientation | Nx | Ny | Nz | $\overline{N}$ |
| Example 1 | 1.2 | 27,000 | 50,000 | 1.5075 | 1.5165 | 1.4975 | 1.5072 |
| Comparative example 1 | 1.2 | 24,000 | 45,000 | 1.5042 | 1.5159 | 1.4970 | 1.5057 |
| Example 2 | 1.1 | 32,000 | 47,500 | 1.5089 | 1.5170 | 1.4988 | 1.5082 |

EXAMPLES 3-1 TO 3-10 AND COMPARATIVE EXAMPLES 3-1 TO 3-4

In Table 2, there are shown ten examples in connection with four comparative examples. The magnification of the first-stage and second-stage longitudinal film orientation and the then film temperature are modified. In the same way as Example 1, a biaxially oriented polypropylene film was obtained. In those examples, in connection with the increase of the magnification of the longitudinal orientation, an oven temperature in the lateral orientation was raised gradually so as not to cause film breakage during its lateral orientation and not to reduce the film transparence.

The result was that the Young's modulus and other properties of the film were improved when carrying out in the first-stage by 50 percent or more of an overall longitudinal orientation. A further effect was improved in such a way that the film temperature in the first-stage longitudinal orientation is set to be equivalent to, or higher than, that in the second-stage longitudinal orientation.

TABLE 2

| | Magnification of longitudinal orientation | | | Temp. (°C.) in longitudinal orientation | | Temp. (°C.) in lateral orientation |
| --- | --- | --- | --- | --- | --- | --- |
| | 1st stage | 2nd stage | Total | 1st stage | 2nd stage | |
| Examples 3-1 | 3.5 | 2.0 | 7.0 | 120 | 130 | 180 |
| Examples 3-2 | 4.5 | 1.4 | 6.3 | 120 | 120 | 175 |
| Examples 3-3 | 4.5 | 1.5 | 6.9 | 130 | 125 | 175 |
| Examples 3-4 | 4.5 | 1.4 | 6.3 | 120 | 130 | 175 |
| Examples 3-5 | 5.0 | 1.5 | 7.5 | 125 | 130 | 180 |
| Examples 3-6 | 5.0 | 1.8 | 9.0 | 125 | 130 | 185 |
| Examples 3-7 | 3.5 | 2.2 | 7.7 | 120 | 120 | 185 |
| Examples 3-8 | 4.0 | 2.0 | 8.8 | 130 | 140 | 190 |
| Examples 3-9 | 6.0 | 1.5 | 9.0 | 130 | 135 | 190 |
| Examples 3-10 | 7.0 | 1.5 | 10.5 | 135 | 140 | 200 |
| Comparative examples 3-1 | 5.0 | — | 5.0 | 125 | — | 170 |
| Comparative examples 3-2 | 6.3 | — | 6.3 | 135 | — | 175 |
| Comparative examples 3-3 | 7.0 | — | 7.0 | 140 | — | 180 |
| Comparative examples 3-4 | 9.0 | — | 9.0 | 145 | — | 190 |

| | Young's modulus (Kg/cm$^3$) | | Refractive index | | | |
| --- | --- | --- | --- | --- | --- | --- |
| | Longitudinal orientation | Lateral orientation | Nx | Ny | Nz | $\overline{N}$ |
| Examples 3-1 | 27,500 | 47,200 | 1.5082 | 1.5161 | 1.4980 | 1.5074 |
| Examples 3-2 | 27,100 | 47,000 | 1.5076 | 1.5170 | 1.4977 | 1.5074 |
| Examples 3-3 | 25,300 | 47,000 | 1.5072 | 1.5168 | 1.4972 | 1.5071 |
| Examples 3-4 | 29,000 | 47,500 | 1.5079 | 1.5170 | 1.4975 | 1.5075 |
| Examples 3-5 | 30,000 | 46,800 | 1.5085 | 1.5166 | 1.4976 | 1.5076 |
| Examples 3-6 | 31,500 | 47,000 | 1.5098 | 1.5150 | 1.4978 | 1.5075 |
| Examples 3-7 | 26,400 | 46,500 | 1.5081 | 1.5172 | 1.4975 | 1.5076 |
| Examples 3-8 | 30,000 | 45,800 | 1.5085 | 1.5165 | 1.4973 | 1.5074 |
| Examples 3-9 | 32,000 | 45,500 | 1.5098 | 1.5155 | 1.4977 | 1.5077 |

TABLE 2-continued

| | | | | | | |
|---|---|---|---|---|---|---|
| Examples 3-10 | 33,000 | 45,000 | 1.5112 | 1.5137 | 1.4980 | 1.5076 |
| Comparative examples 3-1 | 22,000 | 47,000 | 1.5035 | 1.5170 | 1.4968 | 1.5058 |
| Comparative examples 3-2 | 24,000 | 45,000 | 1.5046 | 1.5165 | 1.4972 | 1.5061 |
| Comparative examples 3-3 | 25,000 | 44,000 | 1.5055 | 1.5143 | 1.4970 | 1.5056 |
| Comparative examples 3-4 | 28,000 | 40,000 | 1.5081 | 1.5127 | 1.4973 | 1.5060 |

Comparative Examples 2-1 to 2-4

In each of those examples a polypropylene film was oriented by 5 times in a longitudinal direction at a temperature of 120° C. Following this, the magnification of the lateral film orientation was modified in respective examples. The properties of the polypropylene film thus oriented biaxially are shown in Table 3.

Comparative Examples 4-A to 4-F duced by respective producers. The two measured data of a 50μ film and a 20μ film are shown therein.

EXAMPLES 4-1 to 4-7

In each of those examples a polypropylene film was oriented in a longitudinal direction by a double-stage process. Following this, the film temperature and the magnification of the lateral orientation were modified as shown in Table 4. The properties of the polypropylene film thus biaxially oriented are shown in Table 4.

TABLE 3

| | Magnification of longitudinal orientation | Magnification of lateral orientation | Young's modulus (Kg/cm³) | | Refractive index | | | |
|---|---|---|---|---|---|---|---|---|
| | | | Longitudinal orientation | Lateral orientation | Nx | Ny | Nz | $\overline{N}$ |
| Comparative examples 2-1 | 5.0 | 11.0 | 21,600 | 50,500 | 1.5025 | 1.5186 | 1.5007 | 1.5073 |
| Comparative examples 2-2 | 5.0 | 12.2 | 21,200 | 53,600 | 1.5017 | 1.5217 | 1.5008 | 1.5081 |
| Comparative examples 2-3 | 5.0 | 13.5 | 21,300 | 57,500 | 1.5018 | 1.5225 | 1.5006 | 1.5083 |
| Comparative examples 2-4 | 5.0 | 14.5 | 20,500 | 61,200 | 1.5012 | 1.5238 | 1.5006 | 1.5085 |
| Comparative examples 4 - A company(50μ) | Unknown | Unknown | 23,800 | 50,000 | 1.5027 | 1.5196 | 1.4973 | 1.5065 |
| Comparative examples 4 - A company(20μ) | " | " | 22,000 | 49,300 | 1.5026 | 1.5178 | 1.4968 | 1.5057 |
| Comparative examples 4 - B company(50μ) | " | " | 22,600 | 48,000 | 1.5042 | 1.5180 | 1.4969 | 1.5061 |
| Comparative examples 4 - B company(20μ) | " | " | 22,000 | 50,900 | 1.5027 | 1.5183 | 1.4970 | 1.5060 |
| Comparative examples 4 - C company(50μ) | " | " | 21,100 | 45,300 | 1.5043 | 1.5176 | 1.4967 | 1.5062 |
| Comparative examples 4 - C company(20μ) | " | " | 22,600 | 43,400 | 1.5047 | 1.5162 | 1.4969 | 1.5059 |
| Comparative examples 4 - D company(50μ) | " | " | 23,200 | 49,000 | 1.5047 | 1.5177 | 1.4970 | 1.5065 |
| Comparative examples 4 - D company(20μ) | " | " | 22,000 | 46,500 | 1.5051 | 1.5167 | 1.4968 | 1.5060 |
| Comparative examples 4 - E company(50μ) | " | " | 20,500 | 40,000 | 1.5022 | 1.5162 | 1.4960 | 1.5043 |
| Comparative examples 4 - E company(20μ) | " | " | 23,000 | 46,700 | 1.5044 | 1.5153 | 1.4961 | 1.5053 |

In Table 3, those examples show the measuring results of the biaxially oriented polypropylene film pro-

TABLE 4

| | Magnification of longitudinal orientation | | | Temp. (°C.) in longitudinal orientation | | Preheating in lateral orientation | |
|---|---|---|---|---|---|---|---|
| | 1 stage | 2 stage | Total | 1 stage | 2 stage | Temp. (°C.) | Magnification |
| Example 4-1 | 5.0 | 1.2 | 6.0 | 125 | 130 | 170 | 10 |
| Example 4-2 | 5.0 | 1.4 | 7.0 | 125 | 130 | 180 | 11 |
| Example 4-3 | 5.5 | 1.8 | 9.9 | 130 | 135 | 190 | 12 |
| Example 4-4 | 4.3 | 1.4 | 6.0 | 125 | 130 | 170 | 12 |
| Example 4-5 | 4.3 | 1.8 | 7.7 | 130 | 135 | 190 | 13 |
| Example 4-6 | 5.0 | 2.4 | 12.0 | 135 | 140 | 200 | 15 |
| Example 4-7 | 5.0 | 1.4 | 7.0 | 125 | 130 | 185 | 15 |

| | Young's modulus (Kg/cm³) | | Refractive index | | | |
|---|---|---|---|---|---|---|
| | Longitudinal orientation | Lateral orientation | Nx | Ny | Nz | $\overline{N}$ |
| Examples 4-1 | 26,500 | 47,000 | 1.5073 | 1.5171 | 1.4978 | 1.5074 |
| Examples 4-2 | 28,000 | 48,500 | 1.5093 | 1.5167 | 1.4982 | 1.5081 |
| Examples 4-3 | 36,200 | 55,700 | 1.5133 | 1.5178 | 1.5010 | 1.5107 |

TABLE 4-continued

| Examples 4-4 | 25,500 | 51,200 | 1.5080 | 1.5191 | 1.4984 | 1.5085 |
| Examples 4-5 | 28,500 | 53,000 | 1.5087 | 1.5195 | 1.4990 | 1.5091 |
| Examples 4-6 | 39,700 | 56,100 | 1.5092 | 1.5200 | 1.5011 | 1.5101 |
| Examples 4-7 | 23,500 | 63,300 | 1.5045 | 1.5236 | 1.4990 | 1.5090 |

Comparative Example 5

A polypropylene resin ("MITSUBISHI NOBLEN FY6" made by Mitsubishi Petrochemical Co., Ltd.) having an isotactic index of 97.6% and a melt flow rate of 2.1 g per 10 minutes was heated and fused at a temperature of 245° C. in the extruder, and extruded on a water cooled metal roll by the T-type die. Thus, a sheet of 1 mm thickness was obtained. The sheet was preheated to a temperature of 130° C. and orientated by 7.6 times in a longitudinal direction. After that, it was again preheated, oriented by 10 times in a lateral direction by means of the lateral stretcher and wound up after the heat setting. The measured results of the young's modulus and refractive index of the polypropylene film thus biaxially oriented are shown in Table 5.

EXAMPLE 5

The polypropylene sheet of 1.8 mm in thickness which was used in Comparative Example 5 was preheated to a temperature of 130° C. and oriented by 4.47 in a longitudinal direction. Further, it was preheated to a temperature of 135° C. and again oriented by 1.7 times in the longitudinal direction. Namely, the longitudinal orientation of 7.6 times in total was carried out by a double-stage process. Next, it was again preheated, oriented by 12 times in a lateral orientation and wound up after heat setting. The properties of the polypropylene film thus biaxially oriented are shown in Table 5.

EXAMPLE 6

A polypropylene resin ("MITSUBISHI NOBLEN FY6A" made by Mitsubishi Petrochemical Co., Ltd.) having an isotactic index of 99.1% and a melt flow rate of 2.0 g per 10 minutes was used. The remainder of the process was the same as Example 5. The properties of the polypropylene film thus biaxially oriented are shown in Table 5.

EXAMPLE 7

A polypropylene film was heated and fused at a temperature of 135° C., and oriented by 5.5 times in a first stage longitudinal orientation. Next, it was again heated and fused at a temperature of 145° C. and oriented by 1.5 times in a second-stage longitudinal orientation. The remainder of the process was the same as Example 6. The properties of the polypropylene film thus biaxially oriented are also shown in Table 5.

The preheating temperature and heat setting temperature at the time of the lateral film orientation in each of the aforementioned Examples and Comparative Examples were performed at an upper limit temperature such that lateral orientation could be stabilized and a good film transparence could be maintained.

TABLE 5

|  |  | Comparative example 5 | Example 5 | Example 6 | Example 7 |
| --- | --- | --- | --- | --- | --- |
| Isotactic index (%) |  | 97.6 | 97.6 | 99.1 | 99.1 |
| Magnification of the longitudinal orientation | 1 stage | 7.6 | 4.5 | 4.5 | 5.5 |
|  | 2 stage | — | 1.7 | 1.7 | 1.5 |
|  | Total | 7.6 | 7.6 | 7.6 | 8.3 |
| Temperature in the longitudinal orientation (C.°) | 1 stage | 130 | 130 | 130 | 135 |
|  | 2 stage | — | 135 | 135 | 145 |
| Magnification of the lateral orientation |  | 10 | 12 | 12 | 12 |
| Temperature in the lateral orientation |  | 165 | 170 | 175 | 177 |
| Young's modulus ($Kg/cm^3$) | Longitudinal orientation | 25,000 | 26,000 | 28,000 | 29,000 |
|  | Lateral orientation | 45,000 | 51,000 | 53,000 | 52,000 |
| Refractive index | Nx | 1.5044 | 1.5096 | 1.5098 | 1.5102 |
|  | Ny | 1.5158 | 1.5177 | 1.5190 | 1.5201 |
|  | Nz | 1.4971 | 1.4980 | 1.4984 | 1.4999 |
|  | N | 1.5057 | 1.5084 | 1.5091 | 1.5101 |
| Heat shrinkable rate (Longitudinal orientation /lateral orientation %) | 120° C. | 3.0/2.5 | 2.1/1.5 | 0/0 | 0/0 |
|  | 130° C. | 5.1/5.3 | 3.0/3.0 | 0.5/0.5 | 0.1/0 |
|  | 140° C. | 7.0/8.1 | 4.5/5.3 | 1.0/1.0 | 0.4/0.5 |
|  | 150° C. | 10.2/17.2 | 7.0/9.1 | 1.8/2.2 | 1.0/1.0 |

As described above, a method for producing a biaxially oriented polypropylene according to this invention is characterized in that a longitudinal orientation of a polypropylene film preceding a lateral orientation thereof is carried out by at least a double-stage process. Preferably, in a first-stage longitudinal orientation the polypropylene film is oriented by at least 50 to 90 percent of an overall longitudinal orientation thereof. And the longitudinal orientation is carried out preferably in 2 or 3 steps. The film temperature in each stage's longitudinal orientation is equivalent to, or higher than, that in the former stage's longitudinal orientation.

Thus, it is not necessary to add any special larger device to the existing equipment. Additional cost for realizing this method is very small and no additional space is required.

Further, a biaxially oriented polypropylene film obtained by the method of this invention has a balanced property in its longitudinal and lateral orientation i.e. an excellent rigidity since a refractive index Nx of the longitudinal orientation and a refractive index Ny of the lateral orientation respectively have high values, thereby the total of the former and the latter have a high value.

What is claimed is:

1. A biaxially oriented polypropylene film, wherein a refractive index Nx of the polypropylene film at a temperature of 20° C. to a longitudinal orientation is no less than 1.5040, while a refractive index Ny of the polypropylene film at the same temperature to a lateral orientation is no less than 1.5120, and the total of the former refractive index and the latter refractive index is at least about 3.023.

2. A biaxially oriented polypropylene film according to claim 1, wherein Nx is from about 1.505 to about 1.5130, Ny is from about 1.5130 to about 1.5240 and the sum of Nx and Ny is from about 3.0240 to about 3.0310.

3. A method for producing a biaxially oriented polypropylene film, comprising the steps of:

fusing and extruding a sheet of polypropylene;

cooling said sheet to produce a solid sheet;

orienting said sheet in a first longitudinal orientation;

orienting said sheet in at least a second longitudinal orientation without an intervening orientation in a lateral direction;

said first and at least a second longitudinal orientations producing a total longitudinal elongation of from about 4 to about 15 times;

said first longitudinal elongation being from about 50 to about 90 percent of the total longitudinal orientation; and orienting said sheet in a lateral direction after said first and at least a second longitudinal orientation for a lateral elongation of from about 8 to about 15 times.

4. A process according to claim 3, wherein the steps of longitudinal orientation include from at least 2 to 5 successive elongations in the longitudinal direction wherein the film temperature at each successive elongation in the longitudinal direction is from no lower than, to about 10° C. higher than the film temperature in the preceding elongation in the longitudinal direction.

5. A process according to claim 4, wherein the first elongation in the longitudinal direction achieves from about 50 to about 90 percent of the total elongation in the longitudinal direction.

6. A process according to claim 3, 4 or 5, wherein an isotactic index of the polypropylene is at least 98 percent.

7. A process according to claim 3, wherein the temperature during the last elongation in the longitudinal direction is from about 130° C. to about 160° C.

8. A biaxially oriented polypropylene film produced by the process of claim 3.

* * * * *